United States Patent
Alperovich et al.

[19]

[11] Patent Number: 5,970,403
[45] Date of Patent: Oct. 19, 1999

[54] LOAD BASED CHARGING WITHIN A MOBILE TELECOMMUNICATIONS NETWORK

[75] Inventors: Vladimir Alperovich; Ranjit Bhatia, both of Dallas, Tex.

[73] Assignee: Ericsson Inc., Research Triangle Park, N.C.

[21] Appl. No.: 08/811,420

[22] Filed: Mar. 4, 1997

[51] Int. Cl.[6] .............................. H04M 15/00; H04Q 7/20
[52] U.S. Cl. ...................... 455/406; 455/408; 455/453; 379/111; 379/114; 379/133
[58] Field of Search ...................... 455/405, 406, 455/407, 408, 453, 450; 379/111, 114, 133, 134

[56] References Cited

U.S. PATENT DOCUMENTS

| | | | |
|---|---|---|---|
| 5,303,297 | 4/1994 | Hillis | 455/406 |
| 5,488,655 | 1/1996 | Hamlen | 379/114 |
| 5,519,769 | 5/1996 | Weinberger et al. | 379/112 |
| 5,794,140 | 8/1998 | Sawyer | 455/408 |

FOREIGN PATENT DOCUMENTS

| | | |
|---|---|---|
| 526 118 | 7/1992 | European Pat. Off. . |
| 0 647 055 A1 | 9/1994 | European Pat. Off. . |
| 2 272 607 | 11/1993 | United Kingdom . |
| WO 96/18259 | 6/1996 | WIPO . |
| WO 97/37503 | 4/1997 | WIPO . |
| WO 97/16038 | 5/1997 | WIPO . |

OTHER PUBLICATIONS

PCT Search dated Oct. 30, 1998 for PCT/US98/04130.

*Primary Examiner*—Dwayne D. Bost
*Assistant Examiner*—Raymond B. Persino
*Attorney, Agent, or Firm*—Jenkens & Gilchrist, P.C.

[57] ABSTRACT

A channel resource utilization level associated with a particular cell area is continuously evaluated against a predefined threshold value. The imposed threshold value indicates the minimum level of channel resource utilization desired by the serving mobile telecommunications network. In response to a determination from the evaluation that a particular cell area is being under-utilized, a message indicating that a reduced air-time rate is being offered is broadcast to all mobile stations currently traveling within the affected cell area.

23 Claims, 3 Drawing Sheets

5,970,403

LOAD BASED CHARGING WITHIN A MOBILE TELECOMMUNICATIONS NETWORK

CROSS REFERENCE TO RELATED APPLICATIONS

This application is related to U.S. application for patent Ser. No. 08/766,727, filed Dec. 13, 1996, entitled "Optimal Use of Logical Channels Within A Mobile Telecommunications Network", and to U.S. application for patent Ser. No. 08/699,661, filed Dec. 9, 1996, entitled "Broadcasting Messages To Mobile Stations Within A Geographic Area", all incorporated by reference herein.

BACKGROUND OF THE INVENTION

1. Technical Field of the Invention

The present invention relates to a mobile telecommunications network and, in particular, to the provision of variable charging rates within such a network.

2. Description of Related Art

A "radio interface" or "air interface" provides the connection between a particular mobile station traveling within a particular cell area and the base transceiver station (BTS) providing radio coverage for that particular cell area. Within both analog and digital communications systems, the number of frequency channels allocated for effectuating air-interfaces with mobile stations traveling within a particular cell area is fixed. Because of this limitation, mobile service providers often employ a number of channel resource management schemes to better utilize and to manage these valuable channel resources. One such scheme includes imposing different tariffs or charging rates for calls depending on the time of the day or day of the week. For example, during business hours a larger number of mobile subscribers tend to use their mobile stations, and the use of channel resources is maximized. As a result, the air-time is considered as "peak" hours and mobile subscribers are charged at a higher rate. After business hours, a lesser number of mobile subscribers tend to utilize their mobile service. The air-time is then considered as "off-peak" hours and mobile subscribers are charged at a lower rate. The main rationale behind these charging plans is based on a predicted or estimated intensity of the usage of the finite number of radio channels available within the coverage area. Accordingly, the serving mobile service provider utilizes the differences in charging rates to discourage the use of valuable channel resources during peak hours and to encourage the use of under-utilized channel resources during off-peak hours.

However, it has been shown that such a prediction or estimation of channel utilization is not always accurate or uniform. As an illustration, a first cell covering a mostly residential area might have a lower load even during the peak hours. A second cell covering a mostly business area might have a high-fluctuation load level throughout the day. Therefore, even in periods with a low resource utilization level, subscribers are discouraged by the associated high air-time rate from using otherwise idle resource channels. Furthermore, after implementing such a system, all cells associated within a particular serving area are globally affected by the imposed system regardless of their individual call load. However, a charging plan affecting all of the associated cell areas globally when each individual cell has a different load and resource utilization level does not provide an optimum channel resource management scheme.

There is a need then for a mechanism to selectively provide different charging rates or plans per each cell depending on the associated call load.

SUMMARY OF THE INVENTION

A plurality of mobile service areas, such as cell areas, are continuously monitored by a serving mobile switching center (MSC). When communications channel resources within a cell area are under-utilized, an indication is broadcast to all mobile stations traveling within that particular cell area. This indication informs the mobile subscribers that a reduced charging rate is currently in effect within that area.

In one embodiment of the present invention, a base station controller (BSC) associated with each of the cell areas periodically reports data representing the associated channel utilization level to the serving MSC. The serving MSC then compares the received data with a threshold value associated therewith. If the received data represents a utilization level below the threshold value, the above indication is broadcast to all mobile stations traveling within the associated cell area.

As an alternative, each BSC is associated with a threshold level. When the channel utilization level falls below the associated threshold level, the serving MSC is informed. The serving MSC then instructs the BSC to broadcast the indication of reduced charging rates to the mobile stations.

In another embodiment, the serving MSC broadcasts over a Cell Broadcast Channel indicating that a reduced charging rate is being applied to all mobile stations traveling within that particular cell area.

In yet another embodiment, the serving MSC broadcasts system information over one of the control channels, such as a broadcast channel.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
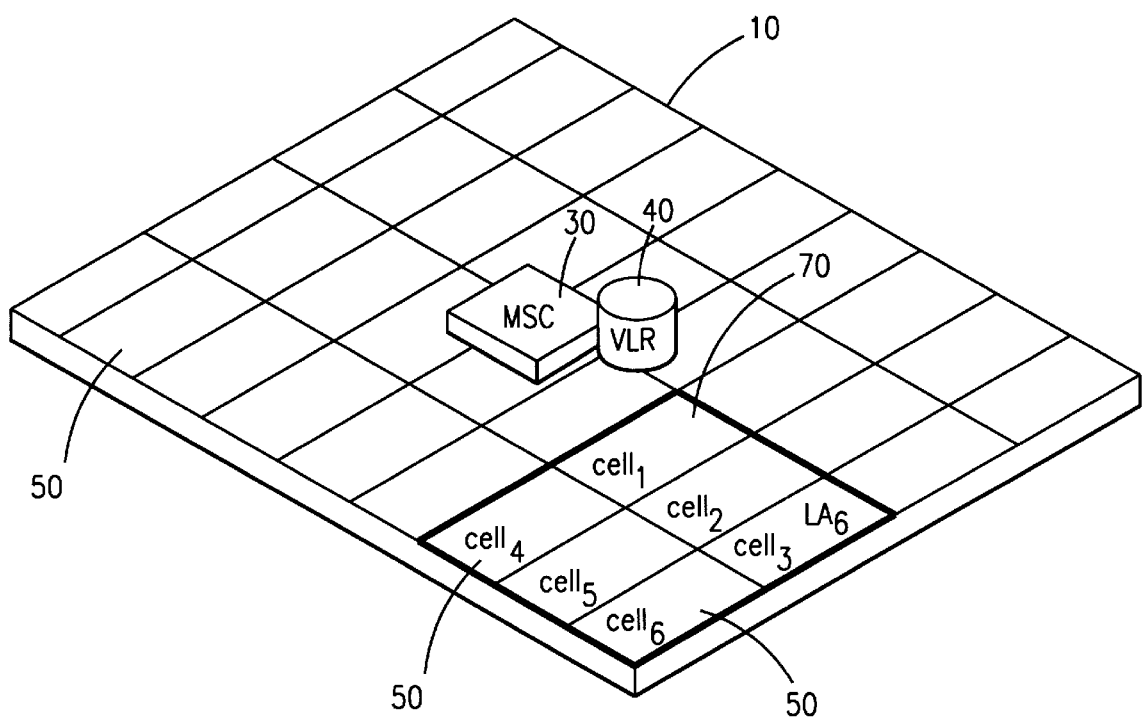
FIG. 1 is a diagram of a mobile service area including a plurality of cell areas.

FIG. 1 is a diagram of a mobile service area including a plurality of cell areas. A particular mobile telecommunications network is divided into a number of geographic areas 10, each area being served by a particular mobile telecommunications node. Such a mobile telecommunications node includes a mobile switching center (MSC) 30 and a visitor location register (VLR) 40 (usually there is a one-to-one relationship between an MSC 30 and its associated VLR 40 and is often referenced collectively as an MSC/VLR). Each geographic area 10 being served by a particular MSC/VLR (hereinafter referred to as an MSC coverage area) is further partitioned into a number of location areas 70. A location area 70 is a part of the MSC coverage area 10 in which a mobile station may move freely without updating location information to the serving MSC/VLR. Therefore, a location area 70 is the area where a paging message is broadcast to find the called mobile station for an incoming call connection. Each location area 70 is then furthered divided into a plurality of cell areas 50. Each cell area 50 is then served by an individual base transceiver station (BTS) or base station controller (BSC) to provide radio coverage towards mobile stations or terminals traveling within that cell area. Accordingly, each BTS or BSC is assigned with a number of frequency channels for effectuating air-interfaces with associated mobile stations.

Figure 2:
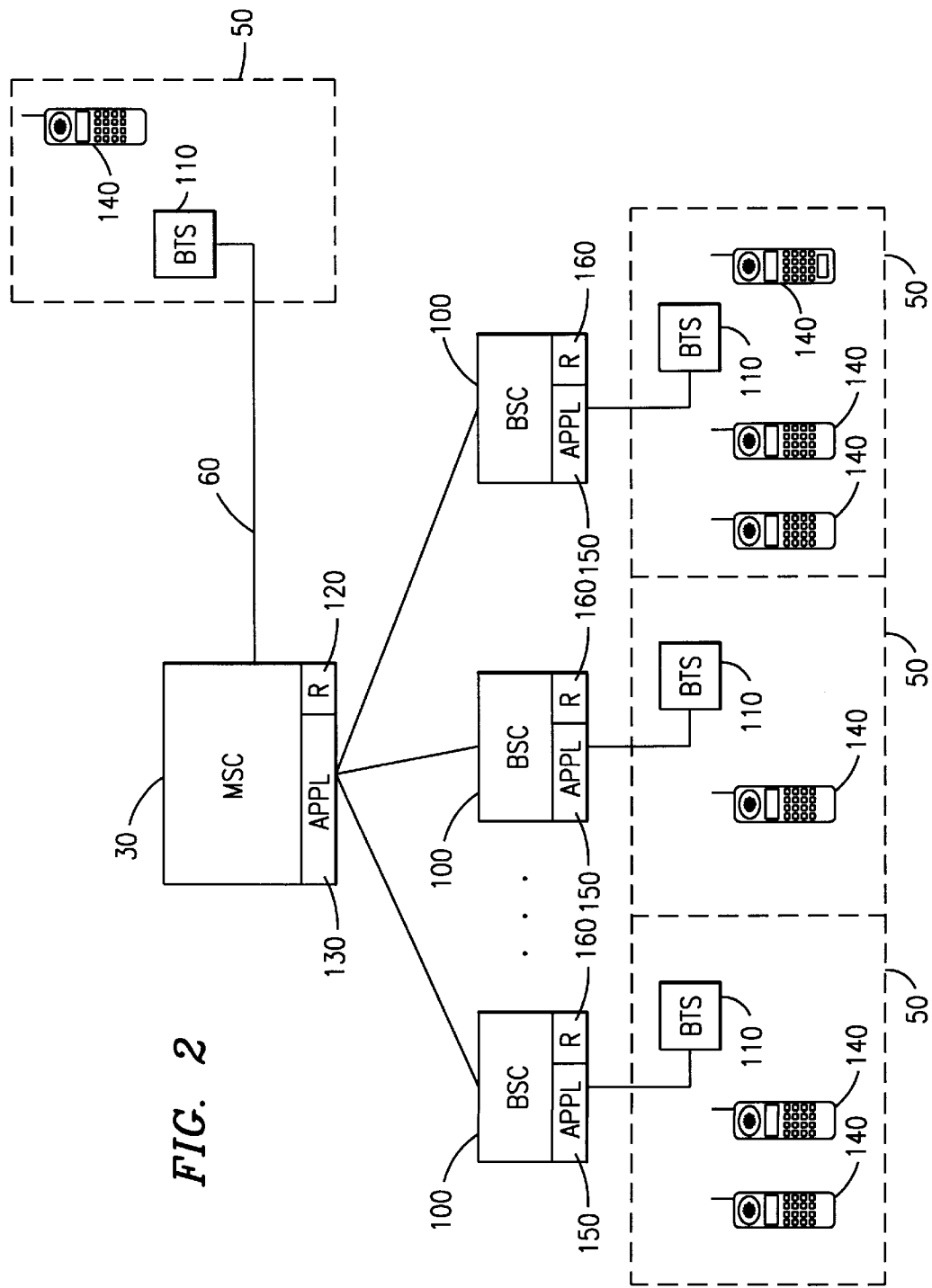
FIG. 2 is a diagram of a Public Land Mobile Network (PLMN) illustrating a serving MSC monitoring the utilization level associated with each cell area.

FIG. 2 is a diagram of a public land mobile network (PLMN) illustrating a serving MSC 30 monitoring the utilization level associated with each cell area 50 in accordance with the teachings of the present invention. As described above, each MSC 30 serves multiple cell areas 50 by way of multiple base station controllers 100 and/or BTSs 110. For exemplary purposes, a number of cell areas 50 are shown placed linearly adjacent to each other. It is to understood, however, that any other types of cell patterns or structures, such as a typical hexagonal grid pattern, are also applicable for the present invention. Furthermore, for illustration, only one cell area is associated with each BSC 100. However, it is to be understood that each BSC 100 may serve multiple cell areas by way of multiple BTSs 110.

In one embodiment of the present invention, a register 120 associated with the serving MSC 30 stores a threshold value imposed by the serving mobile telecommunications network. The imposed threshold value indicates the minimum level of channel utilization desired by the serving network within each cell area 50. As an alternative, the register 120 may store a separate threshold level for each of the associated cell areas 50. For example, for a cell area 50 with a relatively constant or uniform utilization level, a higher threshold value may be imposed. On the other hand, for a cell area 50 with a relatively volatile or high variable utilization level, a lower threshold value may instead be imposed.

An application module 130 associated with the serving MSC 30 periodically requests and receives data representing the current channel utilization level from each BSC 100. For a network configuration where the antennas or BTSs 110 are directly connected to the serving MSC 30 without the use of BSCs 100 (link 60), the application module 130 directly evaluates the utilization level associated with each cell area 50. The application module 130 then determines whether the channel resource utilization level associated with a particular cell area 50 is less than the associated threshold level. In case of a global threshold value, a simple comparison between the global threshold value and the determined channel utilization level is made. In case each cell area 50 is associated with a respective threshold value, the application module identifies the cell area, determines the corresponding threshold value, and evaluates the received data with the determined threshold value. A cell area 50 with a below the threshold level utilization level may then be identified as being under-utilized.

In order to maximize revenue and to increase call capacity within that under-utilized cell area 50, the application module 130 reduces the effective air-time rate, and broadcasts an indication to all mobile stations traveling within that particular cell area 50 informing that a reduced charging rate will be in effect for subsequent call connections. Such indications are periodically broadcast while the utilization level remains below the desired threshold level. Alternatively, such an indication is broadcast after the utilization level stays below the threshold level for a predetermined amount of time. This is to ensure that an indication and the resulting reduced charges do not become effective for sporadic or irregular utilization time periods.

In order to take advantage of the lower air-time charges, the associated mobile subscribers then tend to originate outgoing call connections which they would not have originated otherwise. By inducing an increase in the number of call connections by offering lower rate air-time charges to mobile subscribers, otherwise under-utilized channel resources are then better utilized. For all calls subsequently received within the effective coverage area, the serving MSC adds data to the resulting charging record to indicate that the reduced air-time rate is being applied to the call. As an illustration, when a Global Standard for Mobile (GSM) based mobile station originates an outgoing call connection within a particular cell area, the associated cell identity is sent to the serving MSC/VLR in a COMPLETE layer three (3) Information message. The application module 130 then compares the received cell identity with the previously identified low utilization cell area and determines that the call is being originated within the reduced charging area. A Toll Ticket (TT) is then generated for the resulting call connection with an indication informing the associated billing center that a reduced charging rate needs to be applied for this particular air-interface.

Once the utilization level associated with that particular cell area increases to a level greater than the threshold value, another indication informing the mobile stations of a normal air-time charging rate is broadcast.

As another embodiment of the present invention, instead of the application module 130 associated with the serving MSC periodically requesting and receiving data representing the utilization level associated with each cell, an application module 150 associated with each of the BSC 100 monitors its own utilization level. Each application module 150 within the serving BSC 100 is individually associated with a register (R) 160 and is capable of being assigned with a different threshold value. In response to a determination that its channel resource utilization has decreased to a level lower than the desirable threshold level, the application module 150 informs the connected MSC 30. The application module 130 associated with the serving MSC 30 then instructs the serving BSC or BTS to broadcast the indication to all mobile stations located within the affected cell area.

Alternatively, in case each BSC serves multiple cell areas, a plurality of threshold values, each associated with a cell area, may be stored and utilized by the application module.

For exemplary purposes, a cell area 50 is used in FIG. 2 to illustrate the teachings of the present invention. However, it will be understood that any other types of service areas, such as a location area 70, can be utilized in connection with the present invention and that the description of present invention in the context of cell areas 50 provided herein is by way of explanation of the invention rather than of limitation of the scope of the invention.

Figure 3:
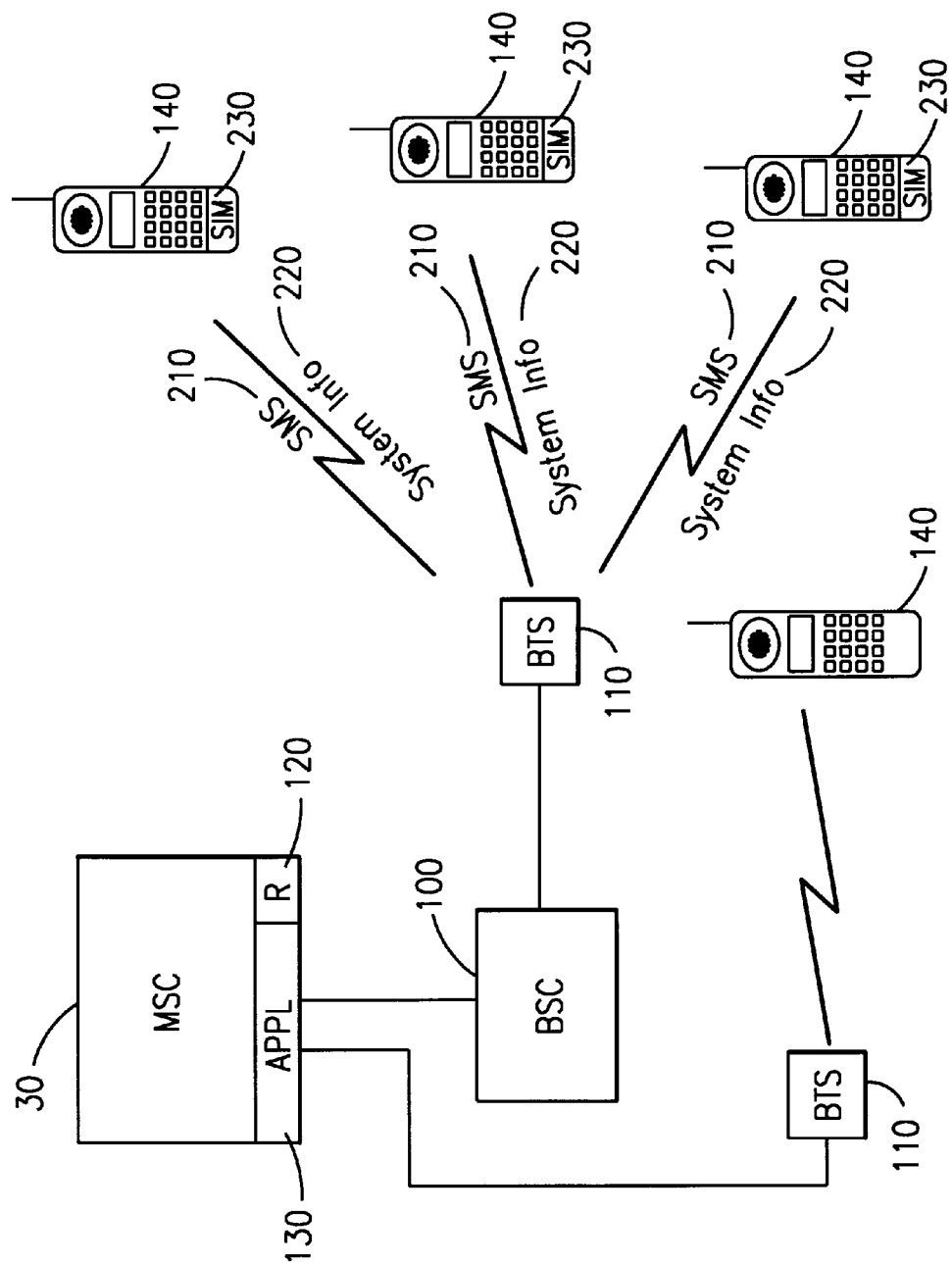
FIG. 3 is a diagram of a PLMN illustrating a serving MSC transmitting an indication to associated mobile stations traveling within a particular geographic area.

Reference is now made to FIG. 3 illustrating a serving MSC 30 broadcasting an indication to associated mobile stations 140 traveling within a particular geographic area. In response to a determination that channel resources associated with a particular cell area are being under-utilized, the application module 130 instructs the associated BSC 100 or the BTS 110 to broadcast information to all mobile stations physically located within the affected cell area. Such information can be broadcast by a number of different ways. A message indicating that a reduced charging rate is being applied can be broadcast over a Cell Broadcast Channel 210. All mobile stations traveling within that particular cell area then monitor the Cell Broadcast Channel 210 and receive the broadcast information. Alternatively, system information informing the same can be broadcast over a broadcast channel (BCH) 220. The BCH 220 is normally used by the serving mobile telecommunications network to broadcast cell or system information to the mobile stations traveling within the associated radio coverage area. The mobile stations 140 then similarly receive the broadcast system information and accordingly inform the associated mobile subscribers of the reduced air-time charge. A text message or symbol, for example, can be displayed to the associated mobile subscribers. Other methods for broadcasting messages towards mobile stations traveling within a particular geographic area are further disclosed in co-pending U.S. application for patent Ser. No. 08/699,661, filed Dec. 9, 1996, entitled "Broadcasting Messages to Mobile Stations Within a Geographic Area," incorporated by reference herein.

As another embodiment of the present invention, mobile subscribers subscribe to a "flexible-charging" subscriber feature. Information indicating that the mobile subscriber has a subscription with the flexible-charging feature is then stored at the associated mobile station 140 in, for example, a Subscriber Identity Module (SIM) card 230 associated with the subscriber. Whenever the above mentioned broadcast data are received, each mobile station 140 retrieves the stored feature information from the associated SIM card 230 and determines whether the associated mobile subscriber has a subscription to the flexible-charging feature. In response to an affirmative determination, the subscriber is then accordingly informed. Otherwise, the associated mobile subscriber is not given the option of originating a call connection at a reduced rate. Accordingly, only the subscribers who have previously subscribed to the flexible-charging subscriber feature are able to receive and to utilize the cost-saving service feature.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for providing a variable charging rate towards mobile stations traveling within a mobile telecommunications network, said method comprising the steps of:

in the network:
   monitoring a traffic load associated with a particular geographic area;
   determining whether said monitored traffic load is less than a predetermined threshold level associated with said geographic area; and
   broadcasting to each mobile station within the geographic areas an indication that a reduced charging rate is available for calls; and in each mobile station:
   determining whether a mobile subscriber associated with the mobile station has a subscription to a flexible-charging feature; and
   in response to an affirmative determination, informing the associated mobile subscriber that a lower charging rate in accordance with said flexible-charging feature will be applied for subsequent call connections.

2. The method of claim 1 wherein said step of monitoring said traffic load includes the step of monitoring said traffic load within a particular cell area.

3. The method of claim 1 wherein said step of informing the associated mobile subscriber further comprises the step of broadcasting an indicative message over a Cell Broadcast Channel.

4. The method of claim 1 wherein said step of informing the associated mobile subscriber further comprises the step of broadcasting an indicative message over a broadcast channel.

5. The method of claim 1 wherein said geographic area is being served by a base station controller (BSC), and said step of monitoring said traffic load within said particular geographic area further comprises the step of receiving data representing said traffic load at a mobile switching center (MSC) serving said geographic area from said BSC.

6. The method of claim 5 further comprises the step of said BSC periodically communicating said data representing current traffic load to said serving MSC.

7. The method of claim 1 wherein said geographic area is being served by a base station controller (BSC) and said step of monitoring said traffic load within said particular geographic area further comprises steps of:
   determining whether said determined traffic load is lower than said threshold level by said BSC; and
   informing a mobile switching center (MSC) serving said geographic area if said traffic load is less than said threshold level.

8. The method of claim 1 wherein said telecommunications network includes a plurality of geographic areas and further comprises the step of associating a threshold value with each of said geographic areas.

9. A system for optimizing the utilization of channel resources within a plurality of cell areas associated with a mobile telecommunications network, comprising:

in the network:
   means for evaluating a channel utilization level within each of said cell areas;
   means for determining from evaluated utilization levels which one of said plurality of cell areas is currently being underutilized; and in the mobile station:
   means for determining from stored feature information whether each associated mobile subscriber has a subscription to a flexible-charging feature; and
   means for informing each mobile subscriber having a subscription to the flexible-charging feature and traveling within said underutilized cell area that a reduced charging rate is being applied.

10. The system of claim 9 wherein said means for determining from said utilization level which one of said plurality of cell areas is currently being under-utilized further comprises means for comparing said evaluated utilization level with a threshold value associated with each of said cell areas.

11. The system of claim 9 wherein said means for informing each mobile subscriber further comprises means for transmitting an indicative information over a Cell Broadcast Channel.

12. The system of claim 9 wherein said means for informing each mobile subscribers further comprises means for broadcasting an indicative information over a broadcast channel (BCH).

13. The system of claim 9 wherein said means for determining which one of said plurality of cell areas is associated within a mobile switching center (MSC) serving said geographic area.

14. The system of claim 9 wherein said means for determining which one of said plurality of cell areas is associated within a base station controller (BSC) serving said geographic area.

15. A system for optimizing the utilization of channel resources within a plurality of cell areas associated within a mobile telecommunications network, said mobile telecommunications network serving a plurality of mobile stations, comprising:

a plurality of base transceiver stations (BTSs), each serving a particular one of said plurality of cell areas;

a plurality of channels associated with each of said plurality of BTSs; and a mobile switching center (MSC) connected to said plurality of BTSs, said MSC further comprising:
an application module for ascertaining which one of said plurality of BTSs are under-utilizing said associated channels; and
means for broadcasting an indication to mobile stations traveling within a cell area associated with said under-utilized BTS; and a mobile station receiving said indication, operable to check whether a mobile subscriber subscribes to a flexible-charging feature and if so then applying a reduced rate for calls in accordance with said flexible-charging feature.

16. The system of claim 15 wherein each cell area is further associated with a base station controller (BSC) and wherein said application module requests and receives data representing a channel utilization level from said BSCs for ascertaining which cell area is being under-utilized.

17. The system of claim 15 wherein each cell area is further associated with a base station controller (BSC) wherein each BSC is assigned with a threshold level for a cell area associated with said BSC and comprises an application module for comparing a channel resource utilization level associated with said cell area with said threshold level and informing said MSC if said utilization level is less than said threshold level.

18. The system of claim 15 wherein said means for broadcasting said indication to said mobile stations further comprises means for transmitting indicative information over a Cell Broadcast Channel.

19. The system of claim 15 wherein said means for broadcasting said indication to said mobile stations further comprises means for broadcasting indicative information over a broadcast channel (BCH).

20. A mobile telephone, comprising:

means for receiving said indication at said mobile telephone that a reduced charging rate is available for subsequent calls;

means for storing information indicating that a mobile subscriber has a subscription with a flexible-charging subscription feature wherein said flexible-charging subscriber feature for allowing a mobile subscriber the option of receiving an indication that a reduced charging rate is available for subsequent calls and allowing access to said reduced charging rate;

means for determining whether a mobile subscriber has subscribed to said flexible-charging subscriber feature; and in response to an affirmative determination and receipt of said indication at said mobile telephone, means for providing said indication to the mobile subscriber that reduced charging rates are in effect.

21. The mobile telephone of claim 20 wherein said means for storing information comprises a Subscriber Identity Module (SIM) card associated, said SIM card for storing information indication that the mobile subscriber has a subscription with the flexible-charging subscriber feature.

22. The mobile telephone of claim 20 wherein said indication that a reduced charging rate is available for subsequent calls being received over a Cell Broadcast Channel.

23. The mobile telephone of claim 20 wherein said indication that a reduced charging rate is available for subsequent calls being received over a broadcast channel.

* * * * *